United States Patent [19]

Iwata

[11] 4,337,454
[45] Jun. 29, 1982

[54] ALARM UNIT FOR PREVENTING THEFT OF VEHICLES

[75] Inventor: Keisuke Iwata, Tokyo, Japan

[73] Assignee: Iwata Electric Co., Ltd., Tokyo, Japan

[21] Appl. No.: 251,210

[22] Filed: Apr. 6, 1981

[51] Int. Cl.³ .............................................. B60R 25/10
[52] U.S. Cl. ...................................... 340/63; 340/545; 307/10 AT
[58] Field of Search ................... 340/63, 64, 541, 542, 340/545, 547; 307/10 AT

[56] References Cited

U.S. PATENT DOCUMENTS 3,848,243 11/1974 Schirmer .............................. 340/63

Primary Examiner—Alvin H. Waring
Attorney, Agent, or Firm—Robert E. Burns; Emmanuel J. Lobato; Bruce L. Adams

[57] ABSTRACT

An alarm unit is provided which prevents a theft of a vehicle by producing acoustical alarm whenever a third party opens a door of the vehicle. The unit operates by applying a remote control signal from an external signal emitter to a pickup assembly which is mounted inside the vehicle on a front or a rear glass pane. A control circuit connected to the pickup assembly is then set in its standby mode, and conditions the unit to produce an acoustical alarm if the door is opened during such mode. The standby mode is reset by a second application of the remote control signal to the pickup assembly.

5 Claims, 4 Drawing Figures

ALARM UNIT FOR PREVENTING THEFT OF VEHICLES

FIELD OF THE INVENTION

The invention relates to an alarm unit for preventing theft of vehicles, and more particularly, to an alarm unit which produces acoustical alarm in response to an opening of the door of a vehicle by a third party.

To prevent a theft of an automobile, there is proposed a mechanical lock which is operative to lock a steering wheel or road wheels and which is locked and unlocked each time a driver gets on or out of the vehicle, in addition to the provision of a door key which locks the door of an automobile. However, a special work is required to install such mechanical lock on the vehicle, and while this prevents a theft of an automobile itself, it serves no purpose in preventing a theft of articles which are disposed within the vehicle. Accordingly, there have been proposed a variety of alarm units which prevent a theft by producing an alarm whenever the door of the automobile is opened by a person other than the owner thereof through an electrical detection of the door opening.

DESCRIPTION OF THE PRIOR ART

An alarm unit which is used to prevent a theft includes a door switch which detects the opening or closing of a door of an automobile, a device for producing an alarm in response to the opening or closing of the door switch, and a time delay circuit which activates the device at a given time interval after the door switch has been operated. The purpose of the time delay circuit is to prevent an activation of the alarm unit during a time which is required for the owner of the automobile to close the door after he has set the alarm unit in operation or during a time interval required for the owner to open the door from the exterior and to deactivate the alarm unit. However, the provision of such time constant circuit permits a thief to turn off or destroy the alarm unit immediately after he has successfully opened the door to get into the vehicle, thus disabling an alarm operation and destroying the very purpose of the alarm unit. To accommodate for this possibility, there has been proposed another alarm unit which eliminates the use of a delay or time constant circuit and which instead incorporates a radio signal receiver which deactivates the alarm unit whenever a particular encoded cipher is received. An alarm unit of such type which can be remotely controlled is advantageous over the alarm unit initially mentioned which includes the time constant circuit in that the alarm unit can be set in operation after the door of the vehicle has been closed, thus enabling the unit to produce an acoustical alarm immediately upon opening of the door by a thief. However, the use of a radio signal is subject to the regulations of the Radio Law, making it difficult to permit a selection of various encoded ciphers or key signals within a limited frequency band and giving rise to the likelihood of causing a malfunctioning by radio interference.

SUMMARY OF THE INVENTION

It is an object of the invention to provide an alarm unit for preventing a theft of a vehicle which is operative in response to the opening or closing of a door of the vehicle and which can be set or reset from the exterior of the vehicle.

It is another object of the invention to provide an alarm unit for preventing a theft of a vehicle which permits the use of and a selection among a number of key signals or encoded ciphers which can be chosen within a broader frequency band without limitation by the Radio Law, by utilizing an electromagnetic coupling of a remote control signal from an external emitter to a receiver located within the vehicle.

In accordance with the invention, there is provided an alarm unit for preventing a theft of a vehicle, comprising a portable signal emitter for producing a magnetic signal of a predetermined frequency, a receiver mounted within the vehicle on a glass pane thereof for receiving the magnetic signal from the emitter through the glass pane, a signal detector connected to the receiver for determining whether the magnetic signal has the predetermined frequency and for producing a control signal when the signal has the predetermined frequency, a circuit connected to the signal detector for storing the control signal therefrom, a control circuit connected to the storing circuit and a door switch which is responsive to the opening or closing of a door of the vehicle, the control circuit producing an output signal in response to an operation of the door switch after the storing circuit has stored the incoming control signal, and an alarm circuit connected to the control circuit and responsive to the output signal.

In a preferred embodiment of the invention, a signal emitter comprises an induction coil which produces a magnetic field of a given cipher frequency. This magnetic signal is applied to a pickup coil, which is mounted on the inside of a front or a rear glass pane of the vehicle as by a sucker, by electromagnetic coupling through the glass. By determining whether the signal induced across the pickup coil has a given frequency through the use of a tuning fork, the output signal is applied to a flipflop if it has the given frequency. The flipflop includes Q or $\overline{Q}$ terminal, the output signal of which renders a Schmidt circuit into a standby mode. The Schmidt circuit becomes operative in response to a signal from a door switch which is turned on when the door is opened, thus activating an alarm circuit to cause it to produce an acoustical alarm. The standby mode of the Schmidt circuit can be terminated by the inversion of the flipflop, which occurs in response to the application of a next magnetic signal. Consequently, when the vehicle is parked and the driver leaves the vehicle, he applies a magnetic signal to the pickup coil through the glass pane from the exterior of the vehicle after he has closed the door. If a thief happens to open the door subsequently, the Schmidt circuit is operated to activate the alarm circuit, thus producing an acoustical alarm. On the other hand, when the owner of the vehicle desires to get into the vehicle, he may apply another magnetic signal to the pickup coil, thus terminating the standby mode of the Schmidt circuit before he opens the door.

In the alarm unit of the invention, a power supply may be turned on and off in interlocked relationship with an engine switch, for example, in a manner such that the power supply is automatically turned on whenever the engine switch is turned off, thus eliminating the need of a separate operation to turn on the power supply. In addition, the door switch may comprise a usual door switch which is provided in the prior art in order to illuminate a room light when the door is opend.

The alarm unit also includes an indicator lamp unit which indicates the operating condition of the alarm unit after the power supply has been turned on. The indicator lamp may be arranged to flash over a given time interval to indicate the fact that the alarm unit is set in operation when the driver has applied an initial magnetic signal after he has closed the door when parking the vehicle. When another magnetic signal is applied, the indicator lamp is continuously illuminated to indicate that the alarm unit has been reset. Obviously, the flashing and the continuous illumination may be used to indicate the opposite conditions. The indicator lamp unit may be disposed on a suitable location on the glass pane of the vehicle where the owner of the vehicle can easily recognize that the alarm unit has been set in operation.

DESCRIPTION OF PREFERRED EMBODIMENT

Figure 1:
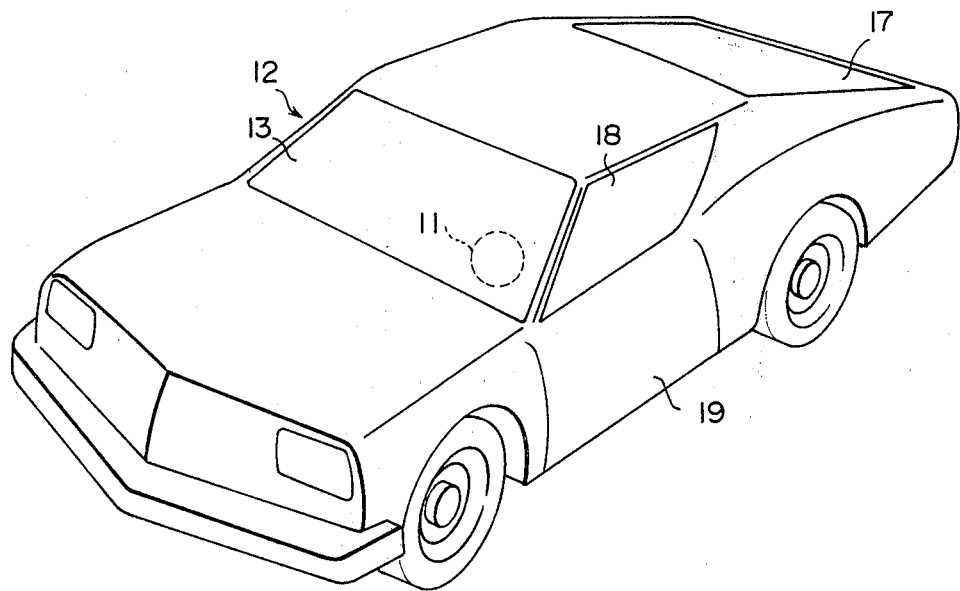
FIG. 1 is a perspective view of an automobile incorporating the alarm unit of the invention.
Figure 2:
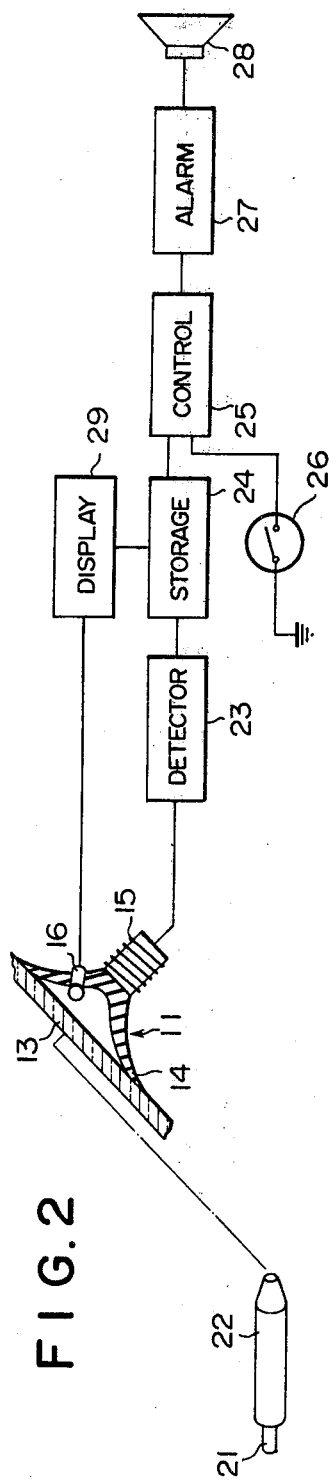
FIG. 2 is a block diagram of the alarm unit according to one embodiment of the invention.

Referring to FIG. 1, there is shown an alarm unit for preventing a theft according to the invention, which includes a receiver having a pickup coil assembly 11 which is mounted on the inside of a front glass pane 13 of an automobile. As shown in FIG. 2, the pickup coil assembly 11 includes a sucker 14 formed of a non-magnetic rubber or synthetic resin, a pickup coil 15 mounted on the sucker 14, and an indicator lamp 16 which is also mounted on the sucker 14. Since the assembly 11 can be detachably mounted on any location by means of the sucker 14, it may be mounted on a rear glass 17 or a door glass 18 in addition to the front glass 13.

Referring to FIG. 2, the alarm unit essentially comprises a transmitter and a receiver. The transmitter is formed by a signal emitter 22 which operates to produce a magnetic field of a given cipher frequency in response to the depression of a pushbutton 21. In addition to the pickup coil assembly 11 which receives a signal from the signal emitter 21 by electromagnetic coupling through the front glass 13, the receiver also comprises a signal detector 23 which receives a signal from the pickup coil 15 and produces an output signal whenever the signal satisfies a given criterion. Additionally, the receiver includes a storage 24 which stores the application thereto of a given signal and also providing an output signal, and a control circuit 25 which assumes a standby mode or terminates such mode in response to an output from the storage 24. The control circuit 25 is also connected to door switch 26 which is mechanically interlocked with the opening or closing of a door 19 of the automobile 12 and which is turned on as the door 19 is opened. An alarm circuit 27 connected to the control circuit responds to an output from the storage 24 and the door switch 26 by producing an acoustical alarm from a loudspeaker 28. The flashing operation or the illumination of the indicator lamp 16 is controlled by an indicator circuit 29, which is in turn connected to the storage 24.

Figure 3:
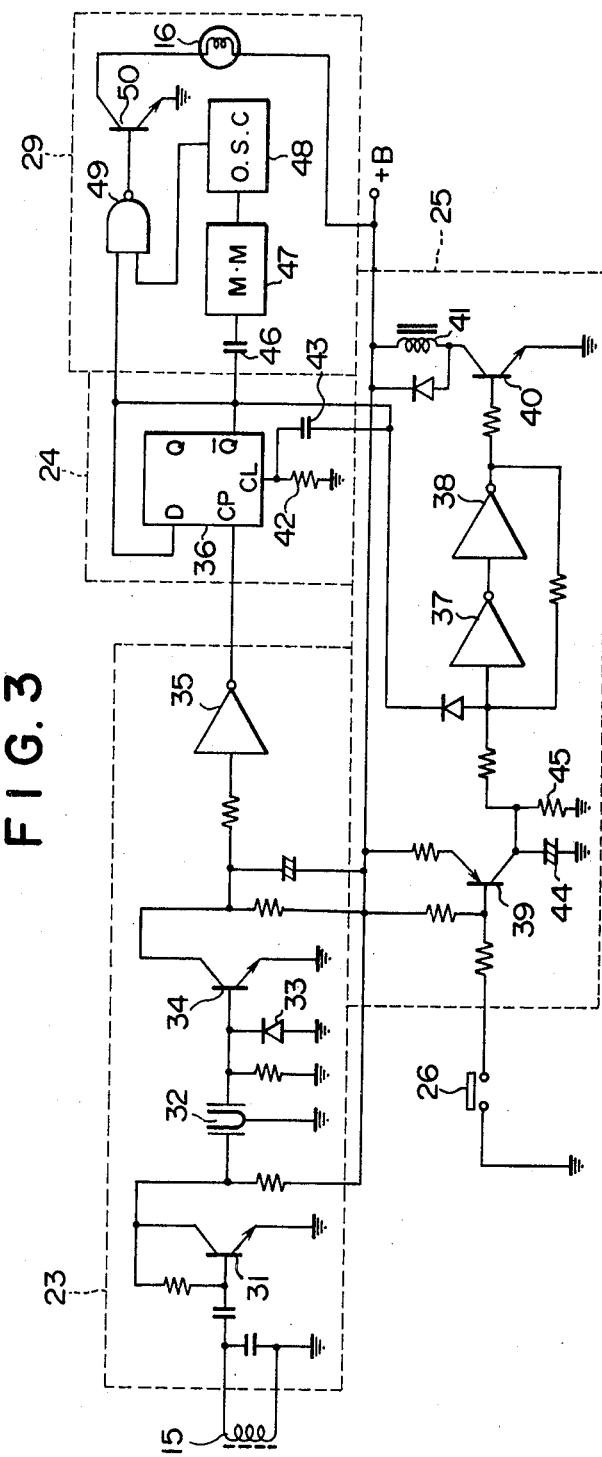
FIG. 3 is a circuit diagram of one form of the receiver used in FIG. 2.

Referring to FIG. 3, the circuit arrangement of the receiver will be described in more detail. The pickup coil 15 is connected so that its output is applied to the input of a tuning fork 32 after amplification by an amplifying transistor 31. The tuning fork 32 operates to determine if the signal applied to its input is equal to a predetermined cipher frequency, and produces an output signal whenever the input signal has the given frequency. The output of the tuning fork 32 is connected through a detector formed by a diode 33 and a transistor 34 to the input of an inverter 35. The output of the inverter 35 is connected to CP terminal of a flipflop 36, $\overline{Q}$ and D terminals of which are connected to the input of a Schmidt trigger circuit formed by a pair of series connected inverters 37, 38, these terminals being connected to the input of the inverter 37. Accordingly, if the tuning fork 32 detects a signal of the given frequency, an output appearing at $\overline{Q}$ and D terminals of the flipflop 36 causes the output of the inverter 38 to assume a low level and causes the pair of inverters 37, 38 to be maintained in this condition. For purpose of initialization of the flipflop 36, a resistor 42 and a capacitor 43 are connected to CL terminal thereof. When the power supply is turned on, an arrangement is made such that a low level potential appears at $\overline{Q}$ terminal of the flipflop 36.

The door switch 26 which is turned on when the door 19 of the automobile 12 is opened is connected to the collector of the transistor 34 and is also connected to the base of a switching transistor 39 which is of PNP type. When the door switch 26 is open, the base assumes a high potential corresponding to that of the power supply, and the transistor 39 does not operate. However, when the switch 26 is closed, the base potential is reduced to operate the transistor 39. The collector of the transistor 39 is connected to the input of the inverter 37 through a time constant circuit formed by a capacitor 44 and a resistor 45. In this manner, a potential of a high level is applied to the inverter 37 during a time interval determined by the capacitor 44 and the resistor 45. The output of the inverter 38 is connected to the base of a transistor 40, the collector of which is connected to one end of a relay coil 41, the other end of which is connected to a power supply +B, the relay coil controlling the operation of the alarm circuit 27. While relay contacts are not shown, they may be used to control the turn-on or -off of the alarm circuit 27. When the coil 41 is energized, the relay contacts are closed, whereby an acoustical alarm is produced.

The indicator circuit 29 which controls the operation of the indicator lamp 16 comprises a monostable multivibrator 47 connected to $\overline{Q}$ terminal of the flipflop 36 through a capacitor 46, and an oscillator 48 connected to the output of the multivibrator 47. In response to a trigger pulse applied to the multivibrator 47, it produces an output signal of a given duration which may be five seconds, for example, for allowing the oscillator 48 to operate during a corresponding time interval. The output of the oscillator 48 is connected to one input of a two input NAND gate 49, the output of which is connected to the base of a transistor 50. The transistor 50 has its collector connected through the indicator lamp 16 with the supply +B, thus continuously illuminating or flashing the lamp 16 in accordance with an output from NAND gate 49. The other input of NAND gate 49 is connected to D terminal of the flipflop 36. Consequently, when the alarm unit is set, the $\overline{Q}$ terminal of the flipflop 36 assumes a high level, and the capacitor 41 produces a trigger pulse, which enables the monostable multivibrator 47 to produce an output signal during a given time interval. This output signal operates the oscillator 48, whereby a signal appears at the output of the NAND gate 49 intermittently to allow the indicator lamp 16 to flash for a given time interval determined by the multivibrator 47, for example, five seconds, indicating that the alarm unit is set in operation. When the alarm unit is reset, the $\overline{Q}$ terminal of the flipflop 36 assumes a low level, whereby the high level signal at the D terminal of the flipflop 36 produces a signal at the output of NAND gate 49 which causes an illumination of the indicator lamp 16. Thus, the illuminated indicator lamp 16 indicates that the alarm unit has been reset.

Figure 4:
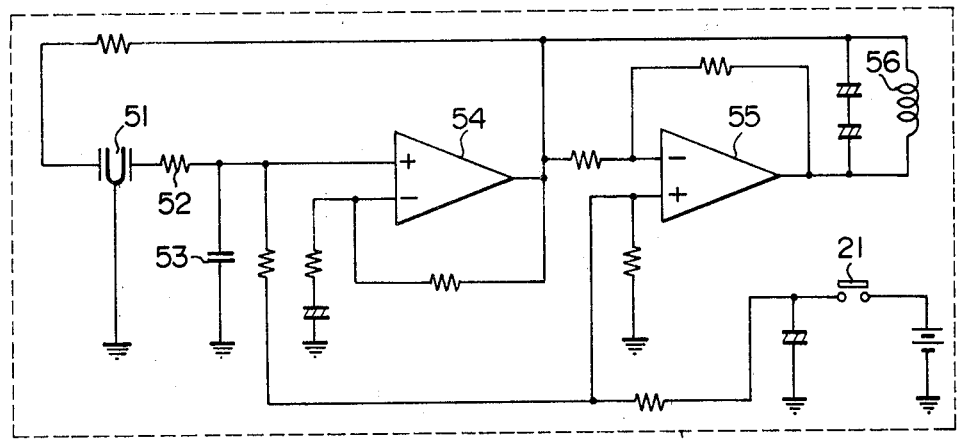
FIG. 4 is a circuit diagram of one form of the emitter shown in FIG. 2.

Since the purpose of the signal emitter 22 is to apply a magnetic field of a given cipher frequency to the coil 15 by electromagnetic coupling when it is brought close and opposite to the pickup assembly 11 mounted on the inside of the glass pane of the automobile 12, with the glass interposed therebetween, the emitter 22 only need produce a very small output. A specific example of the signal emitter 22 will be described with reference to FIG. 4.

A tuning fork 51 which establishes a cipher frequency has its output connected to the non-inverting terminal of an in-phase amplifier 54 through a network of a resistor 52 and a capacitor 53. The output of the amplifier 54 is connected to the input of the tuning fork 51. In this manner, the amplifier 54 and the tuning fork 51 form together a positive feedback circuit. The purpose of the network formed by the resistor 52 and the capacitor 53 is to prevent an abnormal oscillation at spurious frequencies other than the nominal frequency of the tuning fork 51. The pushbutton switch 21 has its one terminal connected to the non-inverting input terminal of the amplifier 54, and when the switch is turned on, the feedback circuit oscillates at a frequency determined by the tuning fork 51. The output of the amplifier 54 is connected to the inverting input terminal thereof and also connected to the inverting input terminal of a buffer amplifier 55, which has its non-inverting input terminal connected to the pushbutton switch 21. The amplifier 55 amplifies an oscillation output from the amplifier 54. The output of the buffer amplifier 55 is connected to the inverting input terminal thereof and also to a coil 56, thus exciting the latter. The opposite end of the coil 56 is connected to the output of the amplifier 54, and a flow of a signal current through the coil 56 produces a magnetic field, which is utilized as a remote control signal.

In operation, when a driver leaves the automobile 12, the apparatus is turned on. This permits a low level to be established at the $\overline{Q}$ terminal of the flipflop 36 by the combination of the resistor 42 and the capacitor 43, allowing the alarm unit to remain without operation if the driver opens the door 19 in order to get out of the vehicle. Upon getting outside the vehicle, the driver brings the free end of the signal emitter 21 close to the pickup assembly 11 from the exterior of the vehicle and through the interposition of the glass pane of the vehicle, thus applying a given signal to the assembly 11 by depression of the pushbutton 21. A signal from the emitter 22 is applied to the pickup coil 15 located within the automobile 12 by electromagnetic coupling. In response thereto, the $\overline{Q}$ terminal of the flipflop 36 within the storage 24 assumes a high level, rendering the inverters 37, 38 in the control circuit 25 operative and rendering the alarm unit in its standby mode. This condition can be recognized by a flashing of the indicator lamp 16.

In the event a third party opens the door 19 of the automobile 12 when the alarm unit is in its standby mode, the closure of the door switch 18 renders the transistor 39 in the control circuit 25 conductive, whereby the positive supply voltage is applied to the inverter 37, causing a positive voltage to appear at the output of the inverter 38. This renders the transistor 40 conductive, energizing the relay coil 41 to operate the alarm circuit 27, which then causes the loudspeaker 28 to produce an acoustical alarm, indicating that a third party has got into the automobile 12. The high level voltage is applied to the inverters 37, 38 for a suitable time interval established by the combination of the capacitor 44 and the resistor 45, for example, for one minute, so that the acoustical alarm cannot be interrupted if the door switch 28 is turned off by closing the door 19 immediately upon generation of the acoustical alarm.

When it is desired to cease the acoustical alarm or when the driver wants to get into the automobile 12 again, it is only necessary that the given signal be applied to the pickup assembly 11 again by means of the signal emitter 22 in the same manner as the unit has been rendered into its standby mode. This causes the $\overline{Q}$ terminal of the flipflop 36 to assume a low level, interrupting the operation of the inverters 37, 38. The transistor 40 is turned off and hence the relay coil 41 is deenergized, turning off the alarm circuit 27. Hence if the acoustical alarm is being produced, it ceases. If the driver opens the door 19 in order to get on the vehicle, no acoustical alarm is produced. The termination of the standby mode can be recognized by the illumination of the indicator lamp 16.

While the tuning fork is utilized to discriminate the given signal in the embodiment described above, an active filter may be used or alternatively the signal may comprise a digitally encoded signal. In addition, while the indicator lamp is mounted on the sucker 14, it may be located anywhere on the automobile provided it is externally visible.

What is claimed is:

1. An alarm unit for preventing a theft of a vehicle, comprising
   a portable signal emitter for producing a magnetic signal of a predetermined frequency,
   a receiver mounted within the vehicle on a glass pane thereof for receiving the magnetic signal from the emitter through the glass pane,
   a signal detector connected to the receiver for determining whether the magnetic signal has the predetermined frequency and for producing a control signal when the signal has the predetermined frequency,
   a circuit connected to the signal detector for storing the control signal therefrom,
   a control circuit connected to the storing circuit and a door switch which is responsive to the opening or closing of a door of the vehicle, the control circuit producing an output signal in response to an operation of the door switch after the storing circuit has stored the incoming control signal,
   and an alarm circuit connected to the control circuit and responsive to the output signal.

2. An alarm unit according to claim 1, further comprising an indicator which indicates that the alarm unit is set into or reset from its standby mode, the indicator including an indicator lamp and an indication control circuit which controls an illumination and a flashing operation of the lamp.

3. An alarm unit according to claim 1 in which the signal emitter includes an induction coil which produces a magnetic field of a predetermined frequency, the receiver including a pickup coil which receives a signal from the induction coil by an electromagnetic coupling, the pickup coil being mounted on the inside of a glass pane of the vehicle.

4. An alarm unit according to claim 1 in which the storing circuit comprises a flipflop having a pair of output terminals, one of which produces an output signal when the magnetic signal is initially applied, the output signal rendering the control circuit in its standby mode, the next occurrence of the magnetic signal causing the flipflop to produce an output signal at its other output terminal, which resets the standby mode of the control circuit.

5. An alarm unit according to claim 1 in which the receiver is detachably mounted on a glass pane of the vehicle by means of a sucker.

* * * * *